United States Patent [19]
Horibe et al.

[11] Patent Number: 5,598,396
[45] Date of Patent: Jan. 28, 1997

[54] OPTICAL DISK REPRODUCING APPARATUS

[75] Inventors: Ryusuke Horibe, Kobe; Masaharu Imura, Neyagawa; Toshiyuki Shimada, Kobe, all of Japan

[73] Assignee: Matsushita Electric Industrial Co., Ltd., Kadoma, Japan

[21] Appl. No.: 599,821

[22] Filed: Feb. 12, 1996

[30] Foreign Application Priority Data

Feb. 15, 1995 [JP] Japan ................................. 7-026849

[51] Int. Cl.$^6$ ................................................ G11B 7/00
[52] U.S. Cl. ...................... 369/124; 369/59; 369/44.34
[58] Field of Search ....................... 369/59, 124, 44.34, 369/54, 47, 60, 48, 32; 360/51, 65

[56] References Cited

U.S. PATENT DOCUMENTS

| | | | |
|---|---|---|---|
| 4,961,182 | 10/1990 | Saito et al. | 369/124 |
| 5,502,711 | 3/1996 | Clark et al. | 369/124 |

FOREIGN PATENT DOCUMENTS

| | | |
|---|---|---|
| 0096106 | 12/1983 | European Pat. Off. |
| 0158219 | 10/1985 | European Pat. Off. |
| 0319218 | 6/1989 | European Pat. Off. |
| 0418100 | 3/1991 | European Pat. Off. |
| 0577402 | 1/1994 | European Pat. Off. |

OTHER PUBLICATIONS

Search Report for EP Application 96102148.2, Mailed May 31, 1996.

*Primary Examiner*—Nabil Hindi
*Attorney, Agent, or Firm*—Renner, Otto, Boisselle & Sklar, P.L.L.

[57] ABSTRACT

The optical disk reproducing apparatus of the invention includes: a waveform equalizing section for emphasizing a predetermined range of frequency band of a reproduced signal; a digitizing section for digitizing the reproduced signal which has been emphasized by the wave equalizing section at a predetermined level, so as to convert the emphasized reproduced signal into a digital signal; a period detecting section for detecting and outputting a period of a predetermined pattern included in the digital signal; a phase lock loop section having a free-run period, for controlling the free-run period based on the output of the period detecting section so that the free-run period becomes substantially equal to a period of a clock component of the digital signal, and for outputting a reproduced clock signal by reproducing the clock component of the digital signal; and a synchronizing section for synchronizing the digital signal with the reproduced clock signal so as to output a synchronized signal as reproduced data.

12 Claims, 15 Drawing Sheets

OPTICAL DISK REPRODUCING APPARATUS

BACKGROUND OF THE INVENTION

1. Field of the Invention

The present invention relates to an optical disk reproducing apparatus for locking-in a phase lock loop for reproducing a clock more easily by controlling the phase lock loop or a waveform equalizer by detecting a linear velocity period from a reproduced signal digitally recorded on an optical disk medium.

2. Description of the Related Art

In order to make full use of the capacity of a recording medium most effectively, a recording method for unifying the recording density on the recording medium by setting a linear velocity to be constant is frequently used, for example, in a compact disk. In the case where a phase lock-in is performed with respect to an optical disk reproduced signal which has been digitally modulated and recorded after performing a mark width modulation so that the linear recording density becomes constant, a pseudo lock-in is very likely to be performed unintentionally. That is to say, the lock-in is likely to result in a frequency different from the clock frequency of the reproduced signal, unless the lock-in is started in a state where the frequency of a clock component of the reproduced signal is proximate to the frequency of a clock generator of a phase lock loop circuit. In order to avoid such a pseudo lock-in, the reproducing linear velocity of the optical disk and a pulse width or a pulse interval contained in a modulated signal are detected, thereby controlling the rotation speed of the disk and the free-run frequency of the phase lock loop and enabling a normal phase locking pull-in.

Such a phase lock-in is realized, for example, by a disk reproducing system shown in FIG. 16. Data such as the data shown in FIG. 17A is recorded on an optical disk 28 so that the linear recording density becomes constant. In this case, the recorded data is assumed to be data regulated so that the number of successive "0" or "1" is in a range from 3 to 11. That is to say, an eight to fourteen modulation (EFM), for example, is employed as a modulation method. A reproduced signal reproduced by a reproducing section 29 exhibits a low-pass filtering characteristic, and therefore, the amplitude of the signal component decreases as the frequency thereof becomes higher. In order to correct the decrease in the amplitude, a high-frequency band is boosted by a waveform equalizing section 1. A treble-boosted reproduced signal (FIG. 17B) is digitized at a predetermined slice level by a digitizing section 2 so as to convert the signal into a digitized signal (FIG. 17C). In this case, an optimum value of the slice level is variable depending upon the variation of the size of a recording mark or the like, but can be automatically adjusted in accordance with the DC component of the reproduced signal.

When a digitized signal is input, a phase comparator 22 compares the phase of the input signal with the phase of the output from a voltage control oscillator 21, thereby generating a phase error voltage corresponding to the phase difference therebetween. A charge pump 23 discharges or absorbs a constant current in accordance with the phase error voltage. A loop filter 24 converts the current output from the charge pump 23 into a voltage, and simultaneously limits the bandwidth thereof. Then, the voltage control oscillator 21 varies its output clock frequency in accordance with the output voltage from the loop filter 24, thereby a phase lock loop is formed. The phase lock loop generates a clock signal (FIG. 17D), the phase of which is synchronized with that of the clock component of the input digitized signal (FIG. 17C). Thereafter, a synchronizing section 6 synchronizes the digitized signal (FIG. 17C) with the synchronized clock signal (FIG. 17D), thereby outputting the synchronized clock signal and the digitized signal data synchronized with the synchronized clock signal.

However, the possibility of a pseudo lock-in cannot be eliminated only by the phase lock loop described above, especially in the situation where the free-run frequency of the voltage control oscillator 21 is much different from the clock frequency of the input digitized signal when the phase lock-in is started. In general, the phase lock-in can be performed so long as the difference between the free-run frequency of the voltage control oscillator 21 and the clock frequency of the digitized signal is within ±5%. Once the difference exceeds this value, an abnormal pull-in is possibly performed. Therefore, an 11T period detecting section 25 is further provided as a first auxiliary lock-in section in addition to the phase lock loop for measuring the temporal period of the recording pattern of the digitized signal (FIG. 17C) where "0" or "1" successively appears 11 times. A predetermined amount of current is injected or absorbed from the charge pump into the loop filter so that the oscillation frequency of the voltage control oscillator becomes low if the measured value is longer than the steady-state value, or that the oscillation frequency of the voltage control oscillator 21 becomes higher if the measured value is shorter than the steady-state value. Phase lock-in can be performed without causing a pseudo lock-in by performing this operation until the oscillation frequency of the voltage control oscillator becomes substantially equal to the frequency of the clock component of the digitized signal.

In addition, by providing a 6T period detecting section 26 as a second auxiliary lock-in section, the temporal period of the recording pattern (000111) or (111000) existing in the digitized signal (FIG. 17C) is measured. If the measured value is larger than the steady-state value, the rotation speed of the motor is accelerated. Alternatively, if the former is shorter than the latter, the rotation speed of the motor is decelerated so as to be proximate to a steady-state linear velocity, whereby making the frequency of the clock component of the digitized signal substantially equal to the free-run oscillation frequency of the voltage control oscillator. Thus pseudo lock-in is eliminated. In this case, the period of the recording pattern (000111) or (111000) corresponds to the period of a rising interval or a falling interval of the digitized signal. Even when a digitizing slice level is varied in the digitizing section 2, such a variation hardly affects the detection period. Therefore, it is possible to realize a detection which is highly resistant to some disturbance for a retrieval seek operation or the like. On the other hand, the 11T period detecting section 25, functioning as a first auxiliary pulling-in section, detects a period from a rising to a falling or a period from a falling to a rising. Therefore, if the digitizing level is varied, then the 11T period detecting section 25 cannot perform a normal detection any longer. Nevertheless, since the period to be detected by the 11T detecting section is long, the precision of the detection is not degraded so much.

In the situation where information recorded on an optical disk medium is retrieved at a high speed for reproducing data therefrom, it is required to perform a phase lock-in at a high speed with respect to a reproduced signal from the disk.

However, according to a method, such as the 6T period detection described above, in which the period of the linear velocity for the optical disk is detected for controlling the rotation speed of the disk, it takes a long time until the rotation speed is settled, so that a considerable amount of time is required before starting the phase lock-in for reproducing a clock. On the other hand, according to a method, such as the 11T period detection described above, in which the pulse width or the pulse interval contained in the modulated signal is detected and the level thereof is compared with that of the steady-state value and a predetermined amount of current is injected or absorbed from the charge pump into the loop filter for controlling the free-run frequency of the voltage control oscillator, the precision of the control is not satisfactory because the control is a digital control. That is to say, there is not any way other than raising or lowering the frequency.

SUMMARY OF THE INVENTION

The optical disk reproducing apparatus of the invention includes: a waveform equalizing section for emphasizing a predetermined range of frequency band of a reproduced signal; a digitizing section for digitizing the reproduced signal which has been emphasized by the wave equalizing section at a predetermined level, so as to convert the emphasized reproduced signal into a digital signal; a period detecting section for detecting and outputting a period of a predetermined pattern included in the digital signal; a phase lock loop section having a free-run period, for controlling the free-run period based on the output of the period detecting section so that the free-run period becomes substantially equal to a period of a clock component of the digital signal, and for outputting a reproduced clock signal by reproducing the clock component of the digital signal; and a synchronizing section for synchronizing the digital signal with the reproduced clock signal so as to output a synchronized signal as reproduced data.

In one embodiment, the period detecting section counts a pulse width or a pulse interval of the predetermined pattern of the digital signal by the use of a clock and holds a counted value by stopping the clock in response to an external signal.

In another embodiment, the external signal is a signal for detecting a defect of a disk.

In still another embodiment, the period detecting section counts a pulse width or a pulse interval of the predetermined pattern of the digital signal by the use of a clock and holds a counted value when the counted value falls into a predetermined range.

In still another embodiment, the period detecting section includes: a first counting section for counting a first interval between rising edges of the reproduced signal; a second counting section for counting a second interval between falling edges of the reproduced signal; and a determining section for calculating one of a minimum value and a maximum value of the sum of the first interval counted by the first counting section and the second interval counted by the second counting section every time a predetermined period has passed, as a period of the predetermined pattern.

In still another embodiment, the period detecting section includes: a counting section for successively counting a pulse width or a pulse interval of the digital signal; a holding section for holding a counted result obtained immediately before by the counting section; an adding section for adding the output of the counting section and the output of the holding section so as to obtain the sum of two successive pulse widths or pulse intervals of the digital signal; and a determining section for calculating one of a minimum value and a maximum value of all the output of the adding section every time a predetermined period has passed, as a period of the predetermined pattern.

In still another embodiment, the period detecting section includes: a counting section for successively counting a pulse width or a pulse interval of the digital signal; a maximum value memory section for holding a maximum value of all the counted values obtained by the counting section during a predetermined period, the maximum value being updated every time a new maximum value is detected; an adding section for adding the maximum value held by the maximum value memory section and a subsequent counted value obtained by the counting section so as to obtain an added value in response to the update of the maximum value in the maximum value memory section; and a maximum value detecting section for outputting the added value as a period of the predetermined pattern every time the predetermined period has passed.

In still another embodiment, the period detecting section includes: a counting section for successively counting a pulse width or a pulse interval of the digital signal; a holding section for holding a counted result obtained immediately before by the counting section; an adding section for adding the output of the counting section and the output of the holding section so as to obtain the sum of two successive pulse widths or pulse intervals of the digital signal; a first determining section for calculating a minimum value of all the output of the adding section every time a predetermined period has passed; a second determining section for calculating a maximum value of all the output of the counting section every time the predetermined period has passed; an estimating section for estimating a range of the output of the second determining section based on the output of the first determining section; and a prohibiting section for outputting the output of the second determining section if the output of the second determining section is within the estimated range of the output of the second determining section, and for prohibiting the output of the second determining section and holding the value obtained immediately before if the output of the second determining section is out of the estimated range of the output of the second determining section.

In still another embodiment, the predetermined range of frequency band emphasized by the waveform equalizing section is varied inversely proportional to the output of the period detecting section.

In still another embodiment, in starting a reproducing operation, the predetermined range of frequency band emphasized by the waveform equalizing section is temporarily shifted to be higher than a frequency band emphasized by the waveform equalizing section during a steady reproducing operation.

In still another embodiment, in performing a seek operation from an inner periphery to an outer periphery, the predetermined range of frequency band emphasized by the waveform equalizing section is temporarily shifted to be higher than a frequency band emphasized by the waveform equalizing section during a steady reproducing operation.

In still another embodiment, the period detecting section counts a period of the predetermined pattern of the digital signal by the use of a clock, and adds or subtracts an offset value smaller than a resolution of a counted result.

In still another embodiment, a frequency of the clock is set so that a minimum resolution for setting a free-run frequency of the phase lock loop section is within a lock-in range of the phase lock loop section.

Under the configurations described above, phase lock-in can be performed surely and at a higher speed by detecting the linear velocity when a signal is reproduced from the optical disk and controlling so that the free-run frequency of the phase lock section becomes substantially equal to that of the clock component of the signal obtained by digitizing the reproduced signal. It is also possible to improve the reliability by further providing a function of holding the output obtained by detecting the linear velocity by detecting the absence of the reproduced signal.

Thus, the invention described herein makes possible the advantage of providing a highly reliable optical disk reproducing apparatus in which a phase lock-in can be performed more easily and at a higher speed by quantitatively detecting the period of the linear velocity for the optical disk and controlling so that the free-run frequency of a synchronous clock generator in a phase locking section becomes substantially equal to the frequency of the clock component of a signal obtained by digitizing a reproduced signal based on the results; the detection is performed more frequently by using both a rising interval and a falling interval as detection information; and an output obtained by detecting a linear velocity is held by detecting an absence in the reproduced signal.

This and other advantages of the present invention will become apparent to those skilled in the art upon reading and understanding the following detailed description with reference to the accompanying figures.

BRIEF DESCRIPTION OF THE DRAWINGS

FIG. 17A shows the recorded data while FIGS. 17B to 17D are waveform charts in a conventional optical disk reproducing apparatus.

DESCRIPTION OF THE PREFERRED EMBODIMENTS

Hereinafter, an optical disk reproducing apparatus according to the present invention will be described by way of illustrative examples with reference to the accompanying drawings.

EXAMPLE 1

Figure 1:
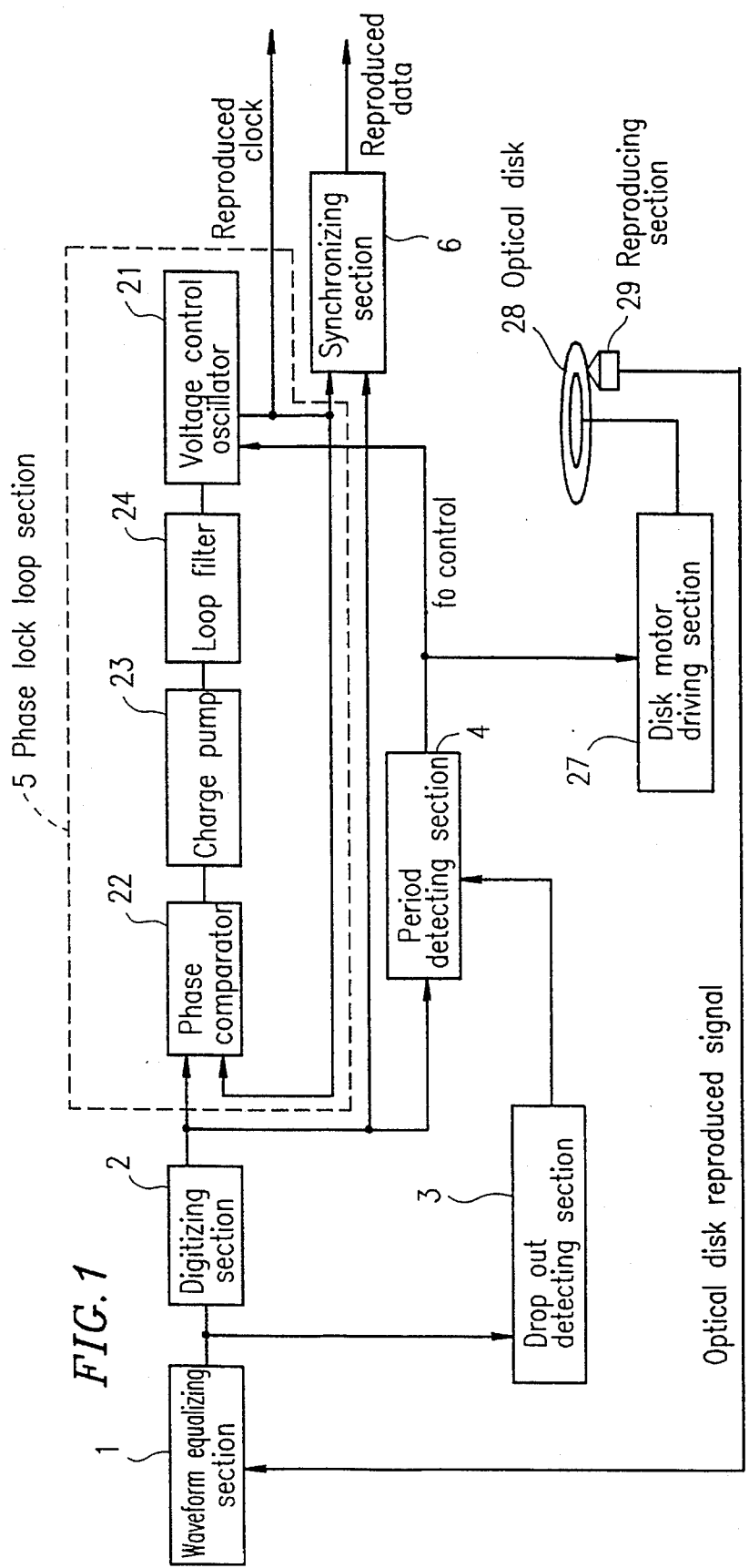
FIG. 1 is a block diagram for an optical disk reproducing apparatus according to a first example of the present invention.

FIG. 1 shows a configuration for an optical disk reproducing apparatus of the first example according to the present invention, Each component of the optical disk reproducing apparatus shown in FIG. 1 will be described below.

A waveform equalizing section 1 corrects a reproduced signal from an optical disk 28 so that the high-frequency band of the reproduced signal is emphasized.

A digitizing section 2 digitizes the thus emphasized reproduced signal at a predetermined level so as to convert the emphasized reproduced signal into a digital signal.

A period detecting section 4 counts a period of a particular pattern included in the digital signal digitized by the digitizing section 2 by the use of a high-frequency clock. A period of the particular pattern of the digital signal can be measured in a temporal resolution of one period of the high-frequency clock. In the case of counting at both edges of the high-frequency clock, such a measurement is made in a temporal resolution of one half period of the high-frequency clock.

The results obtained by the period detecting section 4 include information inversely proportional to the linear velocity, i.e., the clock period information of the reproduced signal. A free-run frequency of a phase lock loop section 5 is set based on the information output from the period detecting section 4, so that the free-run frequency of a phase lock loop section 5 is substantially equal to the clock frequency of the reproduced signal.

In this example, the phase lock loop section 5 includes: a phase comparator 22; a charge pump 23; a loop filter 24; and a voltage control oscillator 21.

Figure 19:
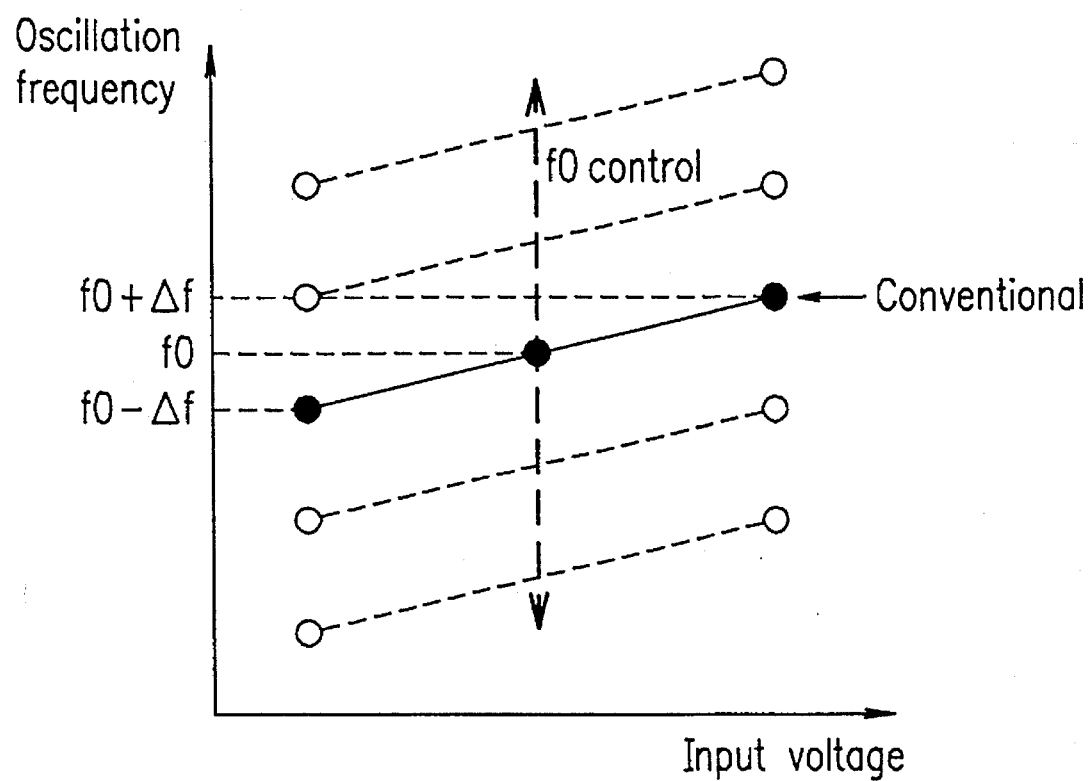
FIG. 19 is a diagram showing the input/output characteristics of the voltage control oscillator 21 in the present invention.

In the conventional voltage control oscillator 21, as indicated by the solid line in FIG. 19, the input/output characteristics of the voltage control oscillator 21 are designed so that the oscillation frequency during a steady-state reproduction from the optical disk may be varied in accordance with the input voltage within a range of $\pm \Delta f$ from the center frequency f0. In this case, in the state where the rotation of the disk has not been settled yet, e.g., immediately after reproduction from the optical disk is started or immediately after a seek operation is finished, the frequency of the clock component of the digital signal obtained by the digitizing section 2 is much different from the oscillation frequency of the voltage control oscillator 21. As a result, the optical disk reproducing apparatus may fall into a state where a phase lock-in cannot be completed (hereinafter, such a state will be referred to as a "pseudo phase lock-in state"). Therefore, it is necessary to control the rotation speed of the motor so as to settle the speed to a speed proximate to the steady-state rotation speed before the phase lock-in operation is started.

In the present invention, the detection result obtained by the period detecting section 4 includes clock period information of the reproduced signal. The clock period information is converted into frequency information by calculating an inverse number of the clock period information. In the present invention, the voltage control oscillator 21 has a center frequency f0 which is controlled adaptively in proportion to the frequency information, as indicated by the broken line in FIG. 19. The period detecting section 4 sets the center frequency f0 based on the frequency information, so that the oscillation frequency of the voltage control oscillator 21 is substantially equal to the frequency of the clock component of the digital signal obtained by the digitizing section 2. This makes it possible to complete phase lock-in at a high speed without waiting for the rotation speed of the motor to be settled.

Thus, the frequency of the clock component of the digital signal obtained by the digitizing section 2 becomes close to the free-run frequency of the phase lock loop section 5. As a result, the phase lock loop section 5 completes a normal phase lock-in without falling into a pseudo phase lock-in state.

The free-run frequency of the phase lock loop section 5 is set electrically. This makes it possible to reduce a time required for starting the phase locking operation as compared with a situation where the phase locking operation starts after the rotation of the disk motor is adjusted. In addition, the free-run frequency of the phase lock loop section 5 is set at a high resolution, so that the free-run frequency of the phase lock loop section 5 is almost equal to the clock frequency of the reproduced signal. This makes it possible to reduce a time required for locking-in the frequency.

The synchronizing section 6 synchronizes the digital signal obtained by the digitizing section 2 with the reproduced clock signal obtained by the phase lock loop section 5, thereby outputting the synchronized signal as reproduced data.

The period detecting section 4 may hold the detected value by stopping the detection operation by the stop of the clock.

Figure 2:
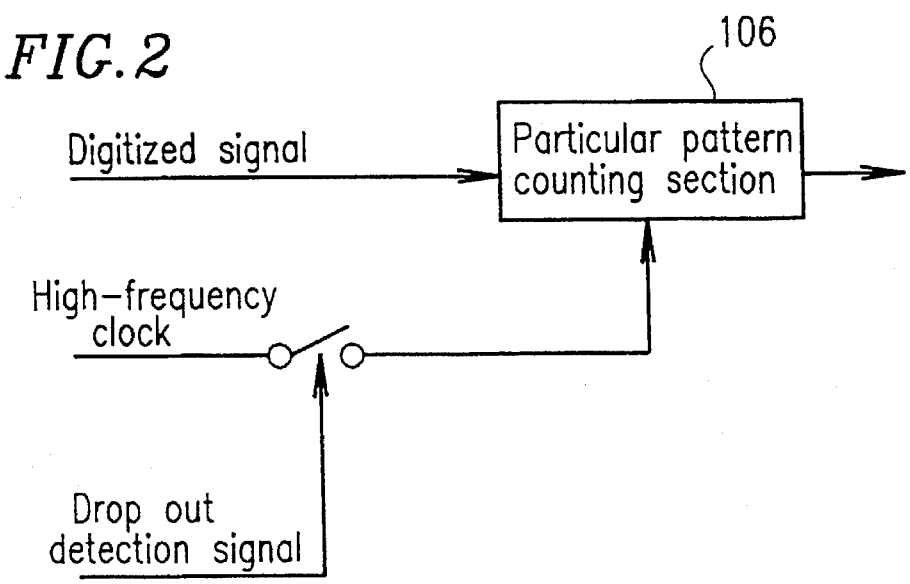
FIG. 2 is a block diagram (1) for a period detecting section in the first example of the present invention.

For example, the supply of the high-frequency clock can be turned on/off in response to a drop out detection signal for the disk as shown in FIG. 2. As a result, it is possible to prevent the detected value from being disturbed by a defect of the disk or the like.

Figure 3:
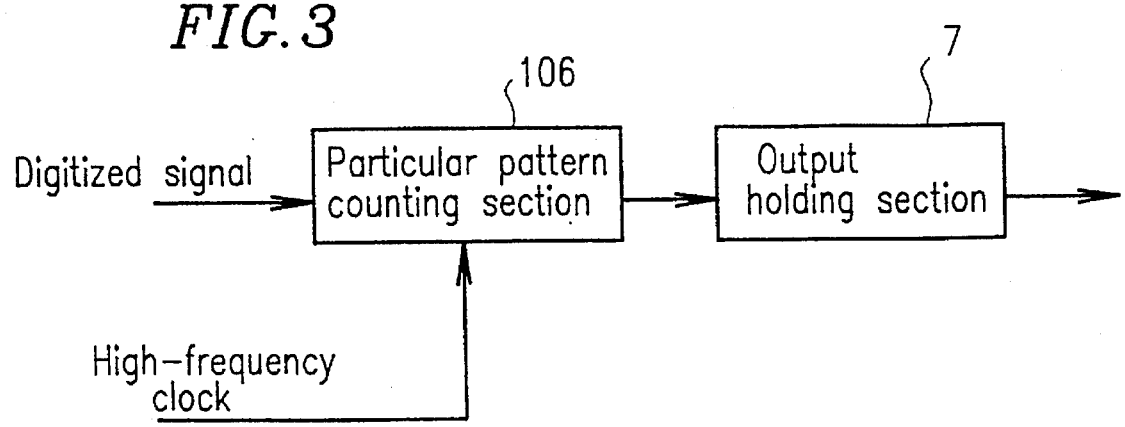
FIG. 3 is a block diagram (2) for the period detecting section in the first example of the present invention.
Figure 4:
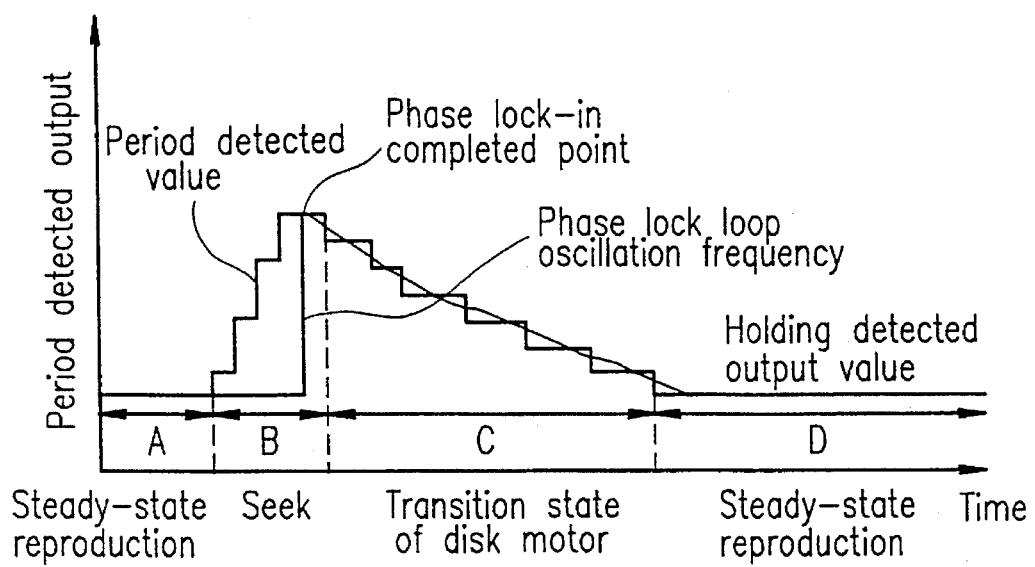
FIG. 4 is a graph showing an output value of the period detecting section in the first example of the present invention.

The period detecting section 4 of the first example may include a particular pattern counting section 106 and an output holding section 7 as shown in FIG. 3. The output holding section 7 monitors a counted value output from the particular pattern counting section 106. More specifically, when the detected value is out of a predetermined range, the output holding section 7 outputs the result without holding it; when the detected value falls into the range, the output holding section 7 holds the output; and from then on, the output holding section 7 continues to hold the output without depending upon the detected result obtained by the period detecting section 4. For example, as shown in FIG. 4, the period detected value becomes large immediately after a seek operation has been performed on an inner periphery side. However, by varying the free-run frequency of the phase lock loop section 5 in accordance with the period detected value so as to be substantially equal to the clock frequency of the reproduced signal, the phase lock-in can be performed immediately after the seek operation has been performed. Then, when the rotation of the disk motor is settled into a steady state and the value detected by the period detecting section 4 falls into the predetermined range after performing the phase lock-in, the output from the period detecting section 4 is fixed.

As a result, even when the period detecting section 4 outputs an erroneous value due to some disturbance such as a defect of the disk during steady-state reproduction, it is possible to prevent variation of the synchronous clock output frequency due to the variation of the free-run frequency, thereby improving stability after the phase lock-in has been performed.

On a compact disk or the like, a so-called sync pattern, i.e., a successive pattern of 11T, 1it (where T is a minimum recording unit) is recorded in order to synchronize every time when a predetermined period has passed. This pattern is a pattern having a largest length which does not exist elsewhere in the data but does not fail to exist once every time a predetermined period has passed. In such a case, by measuring the time from a rising edge of data to the next rising edge of the data or the time from a falling edge of data to the next falling edge of the data every time a predetermined detection time has passed and by calculating the maximum value among the measured time, it is possible to obtain information about a disk reproducing linear velocity.

Figure 5:
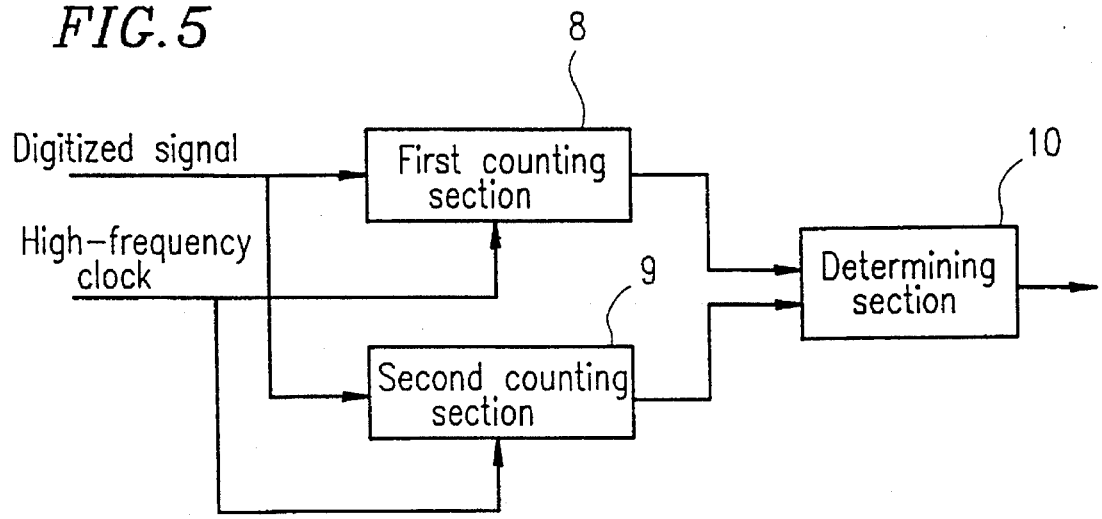
FIG. 5 is a block diagram (3) for the period detecting section in the first example of the present invention.

As shown in FIG. 5, the period detecting section 4 of the first example may include: a first counting section 8 for counting an interval between the reproduced signal rising portions of the digital signal output from the digitizing section 2; a second counting section 9 for counting an interval between the falling portions of the digital signal; and a determining section 10 for outputting a minimum (or maximum) value of the sum of the counted result by the first counting section 8 and the counted result by the second counting section 9 every time a predetermined period has passed.

Thus, the period detecting section 4 shown in FIG. 5 calculates and outputs the minimum (or maximum) value of the sum of two successive pulse widths or pulse intervals. As a result, it is possible to double the counting frequency as compared with a situation of counting a rising edge interval alone or a falling edge interval alone.

Figure 6:
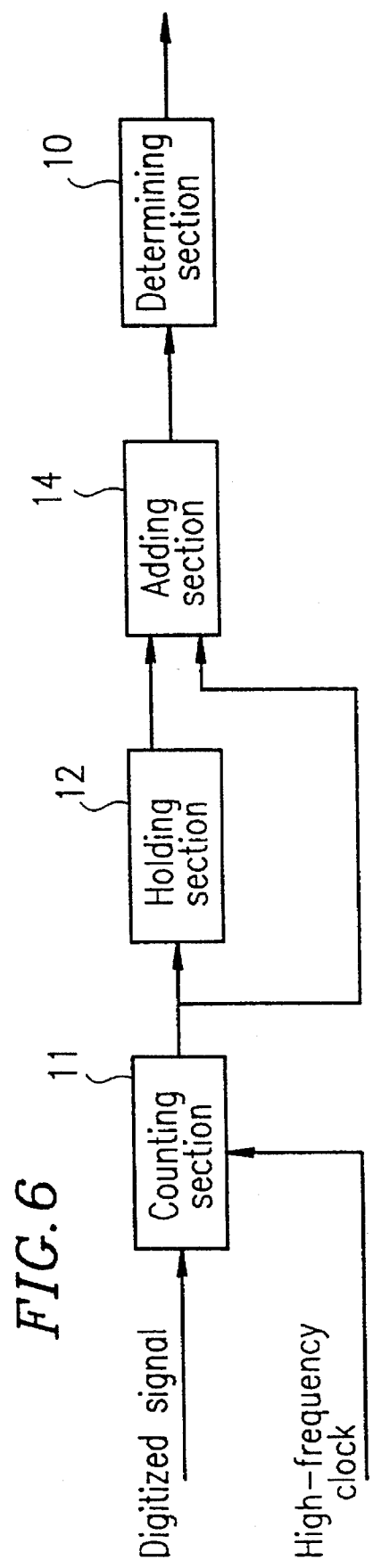
FIG. 6 is a block diagram (4) for the period detecting section in the first example of the present invention.

Alternatively, as shown in FIG. 6, the period detecting section 4 of the first example may include: a counting section 11 for synchronizing the digital signal with a high frequency clock and for successively counting the pulse width or the pulse interval of the digital signal; a holding section 12 for holding the counted result obtained immediately before by the counting section 11; an adding section 14 for adding the output of the counting section 11 and the output of the holding section 12 so as to obtain the sum of two successive pulse widths or pulse intervals; and a determining section 10 for calculating a minimum (or maximum) value of all the output values from the adding section 14 every time a predetermined period has passed.

Thus, the period detecting section 4 shown in FIG. 6 calculates and outputs the minimum (or maximum) value of the sum of two successive pulse widths or pulse intervals. The period detecting section shown in FIG. 6 requires only one counting section, whereas that shown in FIG. 5 requires two counting sections. This makes it possible to reduce the size of the circuit.

Figure 7:
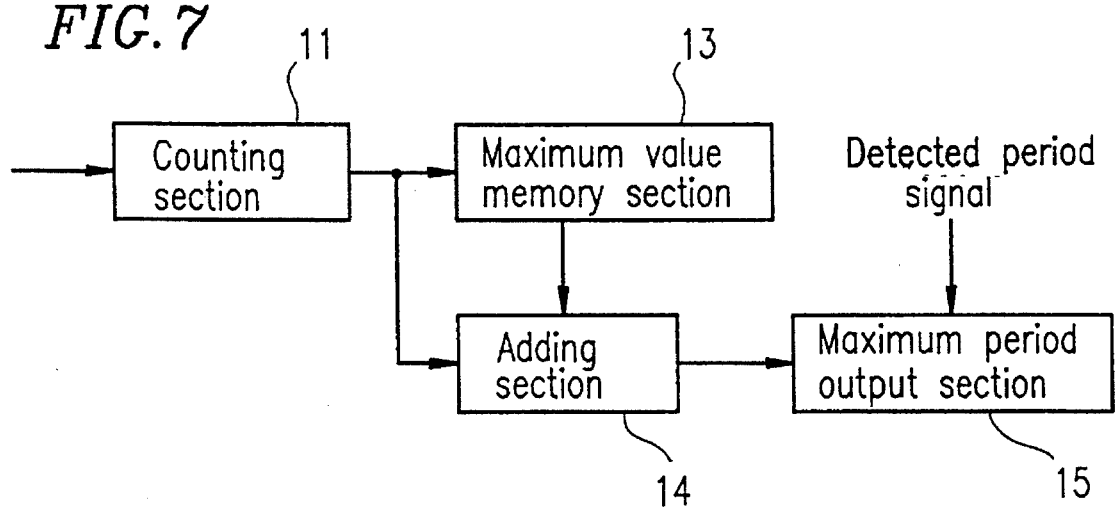
FIG. 7 is a block diagram (5) for the period detecting section in the first example of the present invention.

Alternatively, as shown in FIG. 7, the frequency detecting section 4 of the first example may include: a counting section 11 for synchronizing the digital signal with a high-frequency clock and successively counting a pulse width or a pulse interval of the digital signal; a maximum value memory section 13 for holding a maximum value of the counted value obtained by the counting section 11 during a predetermined detection period, the maximum value held by the maximum value memory section 13 being reset at the starting edge of the predetermined detection period and being updated to a new maximum value every time the new maximum value of the counted value obtained by the counting section 11 is detected by comparing the counted value obtained by the counting section 11 with the value held by the maximum value memory section 13; an adding section 14 for adding the value stored in the maximum value memory section 13 and a subsequent counted value obtained by the counting section 11 in response to the update of the maximum value stored in the maximum value memory section 13 so as to hold and output the added value; and a maximum period output section 15 for outputting the output of the adding section 14 at the ending edge of the predetermined detection period as a period detection result.

Thus, the frequency detecting section 4 shown in FIG. 7 adds a maximum pulse width or pulse interval and a next pulse width or pulse interval and outputs the added result. In the case where a particular pulse width or pulse interval succeeds the maximum pulse width or pulse interval, it is possible to improve the precision of the detection.

Figure 8:
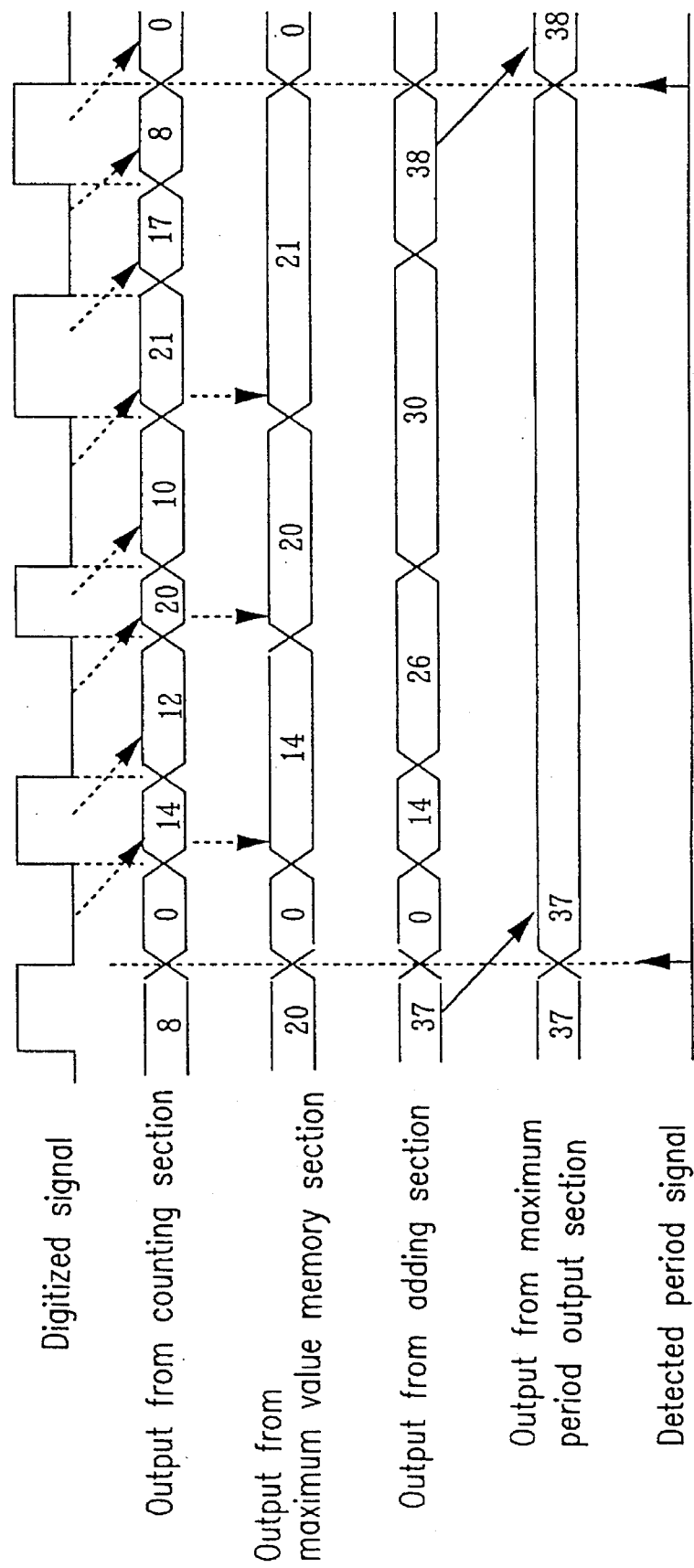
FIG. 8 is a waveform chart showing the operation timings of the part of the period detecting section shown in FIG. 7.

As shown in FIG. 8, every time a maximum pulse width appears, the maximum value memory section 13 holds the maximum value and the adding section 14 adds this value and a next counted value of the pulse width together, and holds the added value. Every time a predetermined period has passed, the held value in the adding section 14 is output and reset simultaneously.

For example, in the case where the maximum pulse width or pulse interval contained in the reproduced signal has a prescribed width of 14T and the succeeding pattern has a prescribed width of 4T, the detection precision can be improved by $18/14$ by adding and detecting these patterns.

Figure 9:
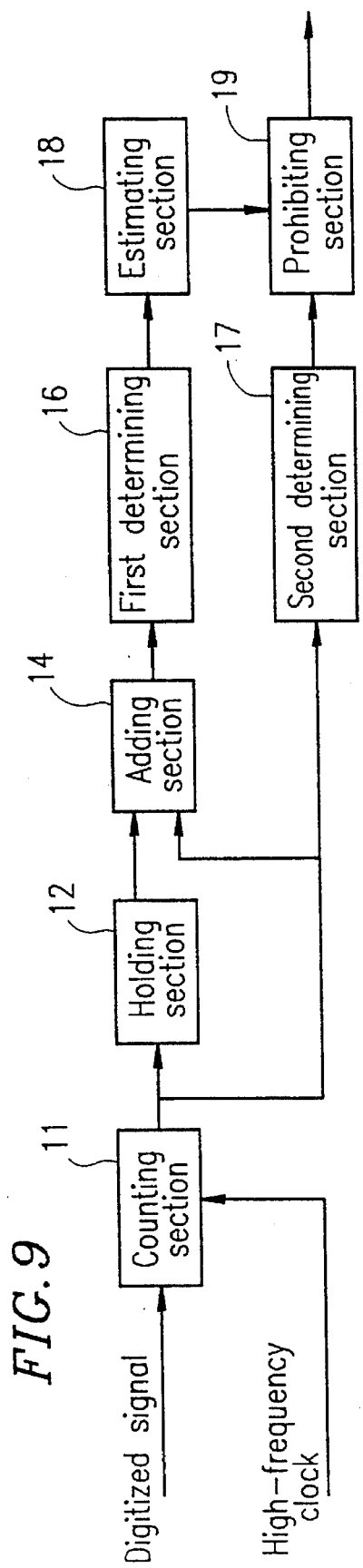
FIG. 9 is a block diagram (6) for the period detecting section in the first example of the present invention.

Alternatively, as shown in FIG. 9, the frequency detecting section 4 of the first example may include: a counting section 11 for synchronizing the digital signal with a high-frequency clock and successively counting a pulse width or a pulse interval of the digital signal; a holding section 12 for holding a counted result obtained from the counting section 11; an adding section 14 for adding the output of the counting section 11 and the output of the holding section 12 so as to obtain the sum of two successive pulse widths or pulse intervals; a first determining section 16 for calculating a minimum value of all the output values from the adding section 14 every time a predetermined period has passed; a second determining section 17 for calculating a maximum value of all the output values from the counting section 11 every time a predetermined period has passed; an estimating section 18 for estimating a range of the output of the second determining section 17 based on the output of the first determining section 16; and a prohibiting section 19 for outputting the output of the second determining section 17 as it is in a normal state, for prohibiting the output of the second determining section 17 and holding the value obtained immediately before if the output of the second determining section 17 is out of the range estimated by the estimating section 18, and for outputting the output of the second determining section 17 as it is again when the output of the second determining section 17 falls into the range estimated by the estimating section 18.

Thus, the frequency detecting section 4 shown in FIG. 9 outputs the output of the second determining section 17 with a high detection precision in a normal state. However, in the situation where it is determined that the output of the second determining section 17 has possibly an error based on the output of the first determining section in which a detection error is less likely to be contained, the frequency detecting section 4 shown in FIG. 9 holds the output of the second determining section 17.

When first determining section 16 has a lower detection error rate than that of the second determining section 17 and the second determining section 17 has a higher detection precision than that of the first determining section 16, the frequency detecting section 4 shown in FIG. 9, can perform a period detection highly resistant to error, while maintaining a high detection precision.

For example, it is assumed that an EFM pattern, i.e., a pattern having a width of 3T to 11T, is recorded on an optical disk on a T basis, and that the first determining section 16 detects a [3T, 3T] pattern to be a minimum value of the recording pattern while the second determining section 17 detects an [11T] pattern to be a maximum value of the recording pattern. Therefore, both determining sections contribute to obtaining information about the disk reproducing linear velocity.

In a case where the first determining section 16 has a lower detection precision and a higher reliability and the second determining section 17 has a higher detection precision and a lower reliability, simultaneously improving the precision and the reliability is realized by expecting the output value from the second determining section 17 based on that from the first determining section 16 which has a higher reliability (for example by multiplying the latter value by $11/6$); by outputting the output value from the second determining section 17 if the output value from the second determining section 17 is close to the expected value; by holding an immediately previous value output from the second determining section 17 as a detection error if the output value from the second determining section 17 is different from the expected value.

In the method of this example, two successive pulse widths or pulse intervals are added together and a minimum value is calculated every time a predetermined period has passed. Alternatively, by independently counting an interval in a rising portion of the reproduced signal and an interval in a falling portion of the reproduced signal, the minimum value in both portions may be calculated every time a predetermined period has passed as shown in FIG. 5. Furthermore, the input to the second determining section 17 may be used for calculating the maximum value of the output from the adding section 14 every time a predetermined period has passed.

EXAMPLE 2

Hereinafter, an optical disk reproducing apparatus of the second example according to the present invention will be described with reference to FIG. 10.

A waveform equalizing section 1 corrects a reproduced signal so that the high-frequency band of the reproduced signal is emphasized.

A digitizing section 2 digitizes the thus emphasized reproduced signal at a predetermined level so as to convert the emphasized reproduced signal into a digital signal.

A period detecting section 4 counts a period of a particular pattern included in the digital signal digitized by the digitizing section 2 by the use of a high-frequency clock. A period of the particular pattern of the digital signal can be measured in a temporal resolution of one period of the high-frequency clock. In the case of counting at both edges of the high-frequency clock, such a measurement is made in a temporal resolution of one half period of the high-frequency clock.

When a reproducing linear velocity is high, the bandwidth of the reproduced signal during reproduction from the optical disk becomes larger proportionally to the linear velocity. Alternatively, if the linear velocity is low, the bandwidth becomes smaller. The output from the period detecting section 4 is period information about the period of the linear velocity. The period information has a value inversely proportional to the linear velocity.

Figure 10:
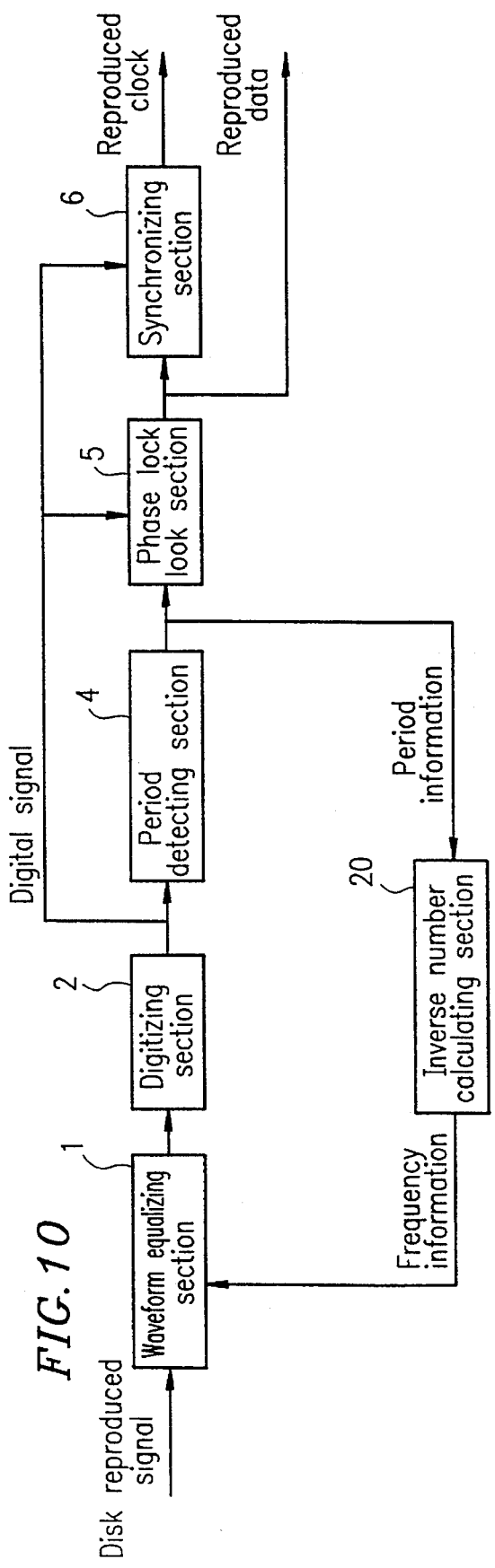
FIG. 10 is a block diagram for an optical disk reproducing apparatus according to a second example of the present invention.

As shown in FIG. 10, an inverse number calculating section 20 calculates an inverse number of the detected result of the linear velocity period output from the period detecting section 4 so as to convert the period information into frequency information and outputs the frequency information. The waveform equalizing in the waveform equalizing section 1 can be optimized by varying the high-frequency band to be emphasized in proportion to the frequency information output from the inverse number calculating section 20.

The result obtained by the period detecting section 4 includes linear velocity information, i.e., the clock frequency information of the reproduced signal. The free-run frequency of the phase lock loop section 5 is set so as to be substantially equal to the clock frequency of the reproduced signal based on the clock frequency information. Thus, the frequency of the clock component of the digital signal obtained by the digitizing section 2 becomes close to the free-run frequency of the phase lock loop section 5. As a result, the phase lock loop section 5 completes a normal phase lock-in without falling into a pseudo phase lock-in state.

A synchronizing section 6 synchronizes the digital signal obtained by the digitizing section 2 with the reproduced clock signal obtained by the phase lock loop section 5, so as to output the synchronized signal as reproduced data.

Alternatively, the phase lock loop section 5 may receive the output of the inverse number calculating section 20 as an input. In this case, the phase lock loop section 5 sets the free-run frequency of the phase lock loop 5 in proportion to the output of the inverse number calculating section 20, so that the free-run frequency becomes substantially equal to the clock frequency of the digital signal.

Figure 11:
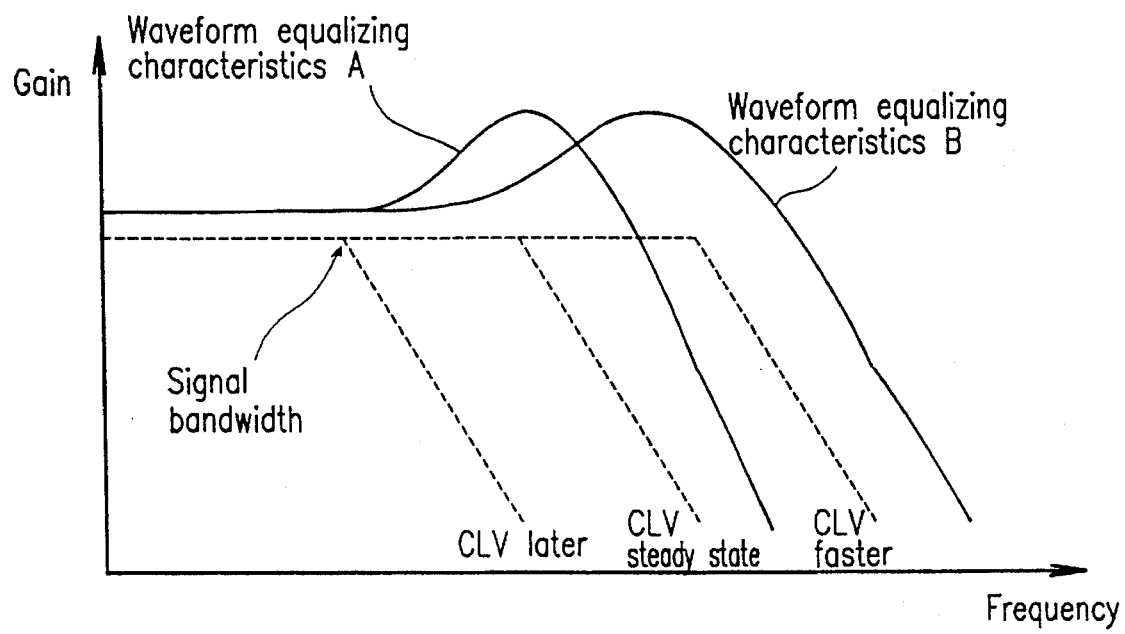
FIG. 11 is a graph showing the frequency characteristics of a waveform equalizer and the frequency bandwidth of a signal.

In the first and the second examples, in the case where the waveform equalizing section 1 has the frequency characteristics indicated by (A) in FIG. 11, the band of the signal frequency possibly exceeds the pass band of the waveform equalizing section 1 (the "CLV faster" state shown in FIG. 11), if the linear velocity of the optical disk is faster than that in a steady state. Since the rotation of the disk is not in the steady state when the reproduction from the disk is started, the frequency band of the reproduced signal possibly exceeds the pass band of the waveform equalizing section 1.

Figure 12:
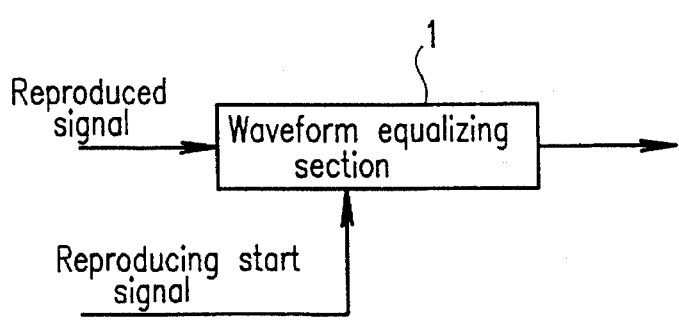
FIG. 12 is a block diagram (1) for the waveform equalizer in the first example of the present invention.

Therefore, it is preferable that the waveform equalizing section 1 receives a reproducing start signal as an external signal (see, FIG. 12), and shifts the high-frequency band of the reproduced signal to be emphasized from the low-frequency side to the high-frequency side in response to the reproducing start signal, as compared with a case of a normal reproduction (see, the frequency characteristics indicated by (A) and (B) in FIG. 11). This prevents the lack of a signal frequency component.

In the first and the second examples, in the case where the waveform equalizing section 1 has the frequency characteristics indicated by (A) in FIG. 11, the frequency band of the reproduced signal possibly exceeds the pass band of the waveform equalizing section 1 (the "CLV faster" state shown in FIG. 11), if the linear velocity of the optical disk is faster than that in a steady state. Since a long time is required for the rotation of the motor to be converged into a steady-state rotation especially in seeking from an inner periphery to an outer periphery of the disk, the band of the signal frequency is likely to exceed the pass band of the waveform equalizing section immediately after the seek operation has been performed.

Figure 13:
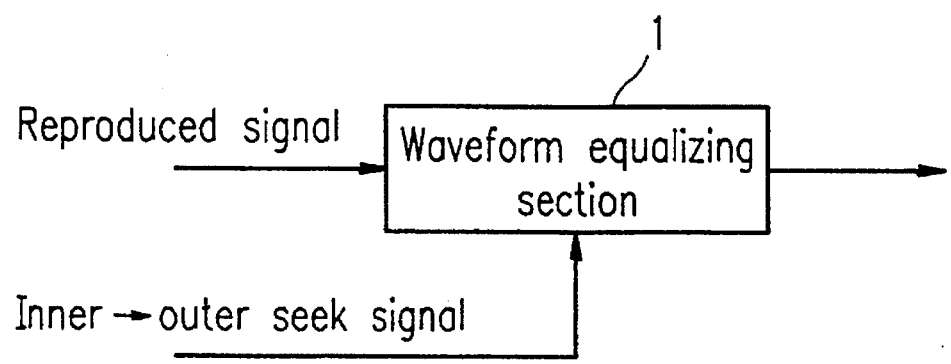
FIG. 13 is a block diagram (2) for the waveform equalizer in the first example of the present invention.

Therefore, it is preferable that the waveform equalizing section 1 receives a seeking signal from an inner periphery to an outer periphery of the optical disk as an external signal (see, FIG. 13), and shifts the high-frequency band of the reproduced signal to be emphasized from the low-frequency side to the high-frequency side in response to the seeking signal from an inner periphery to an outer periphery of the optical disk, as compared with a case of a normal reproduction (see, the frequency characteristics indicated by (A) and (B) in FIG. 11). This prevents the lack of a signal frequency component.

In addition, the period detecting section 4 counts the period of the particular pattern of the digital signal digitized by the digitizing section 2 with a high-frequency clock. In this case, the temporal length of the particular pattern is measured by a least significant resolution corresponding to one period of the high-frequency clock (=1 LSB). In the case of counting at both edges of the high-frequency clock, a resolution corresponding to one half period is used.

Figure 14:
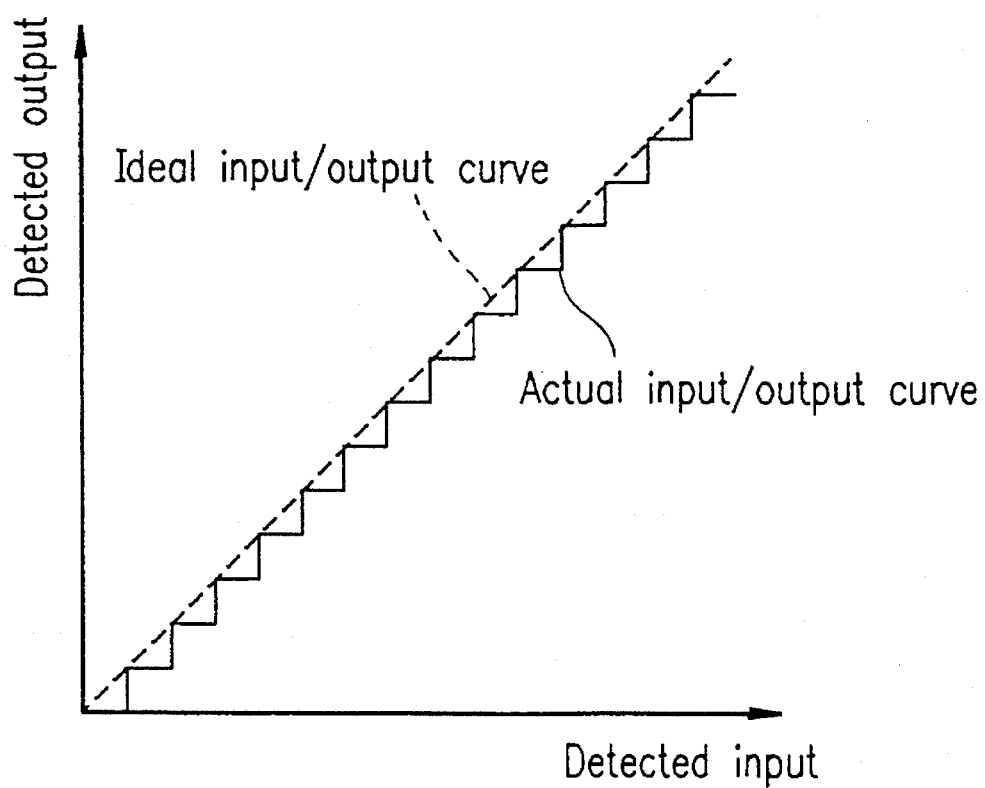
FIG. 14 is a graph showing an ordinary output value of the frequency detecting section in the first example of the present invention.

In FIG. 14, the solid line denotes the relationship between the temporal length of a particular pattern which is input to the period detecting section 4 and the output detected by the period detecting section 4. When the period detecting section 4 adopts a method for counting a period of the particular pattern by the use of a high-frequency clock, a step-shaped detection curve such as that shown in FIG. 14 is obtained.

In FIG. 14, the broken line denotes an ideal detection curve. A maximum error between the detection curves indicated by the solid line and the broken line is 1 LSB corresponding to the least significant bit of the counter.

Figure 15:
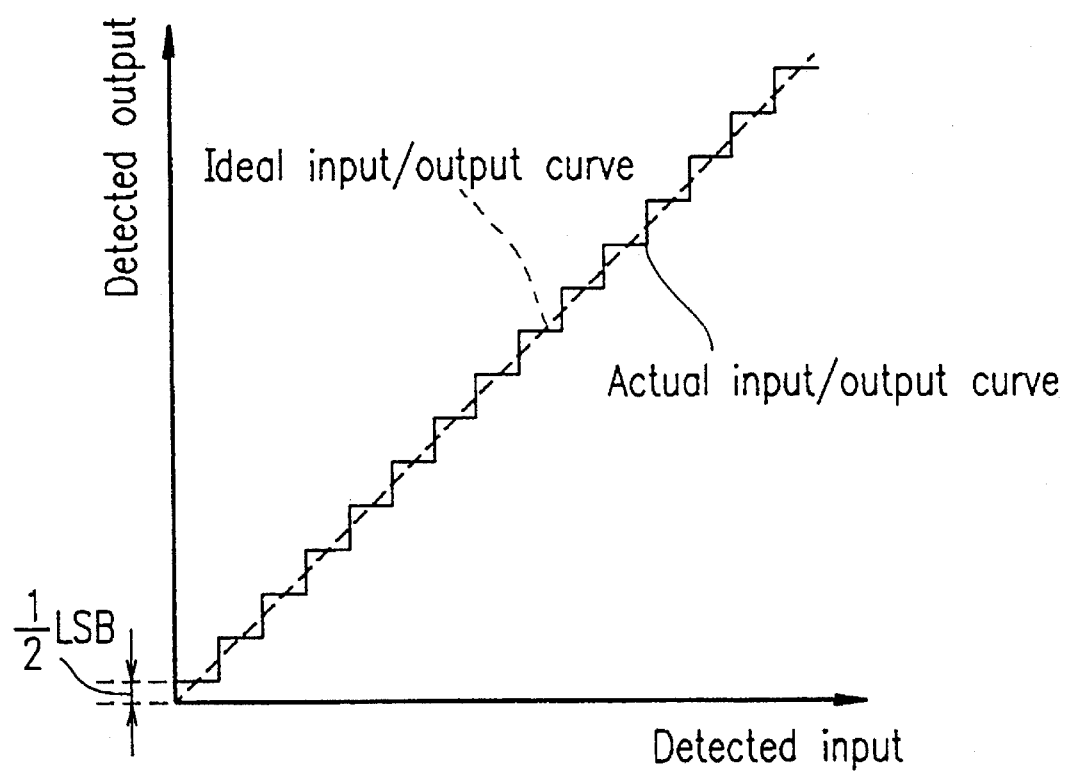
FIG. 15 is a graph showing an offset output value of the frequency detecting section in the first example of the present invention.
Figure 16:
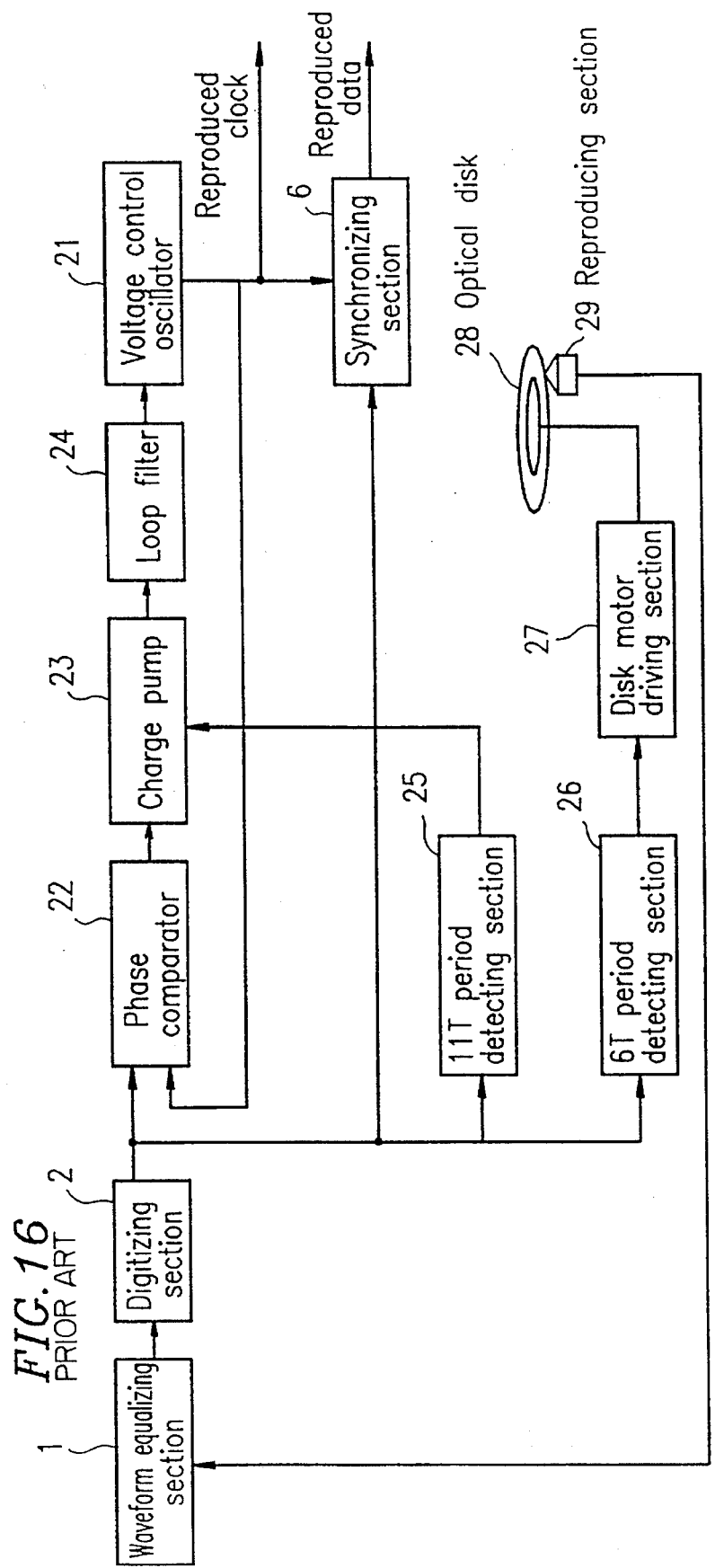
FIG. 16 is a block diagram for a conventional optical disk reproducing apparatus.
Figure 17:
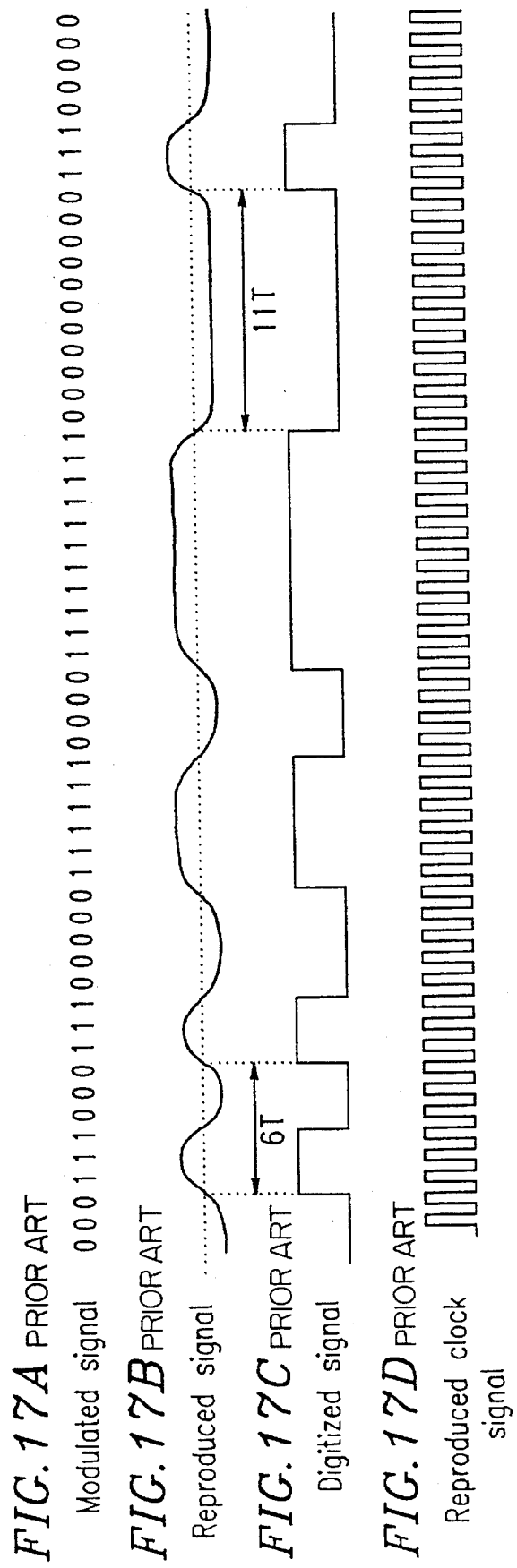

As shown in FIG. 15, by adding an offset of (½) LSB to the output value, a maximum error between the detection curves indicated by the solid line and the broken line can be reduced to (½) LSB. The amount of the offset is not limited to (½) LSB. An arbitrary offset which is equal to or smaller than (½) LSB may be used instead of the offset (½) LSB.

Figure 18:
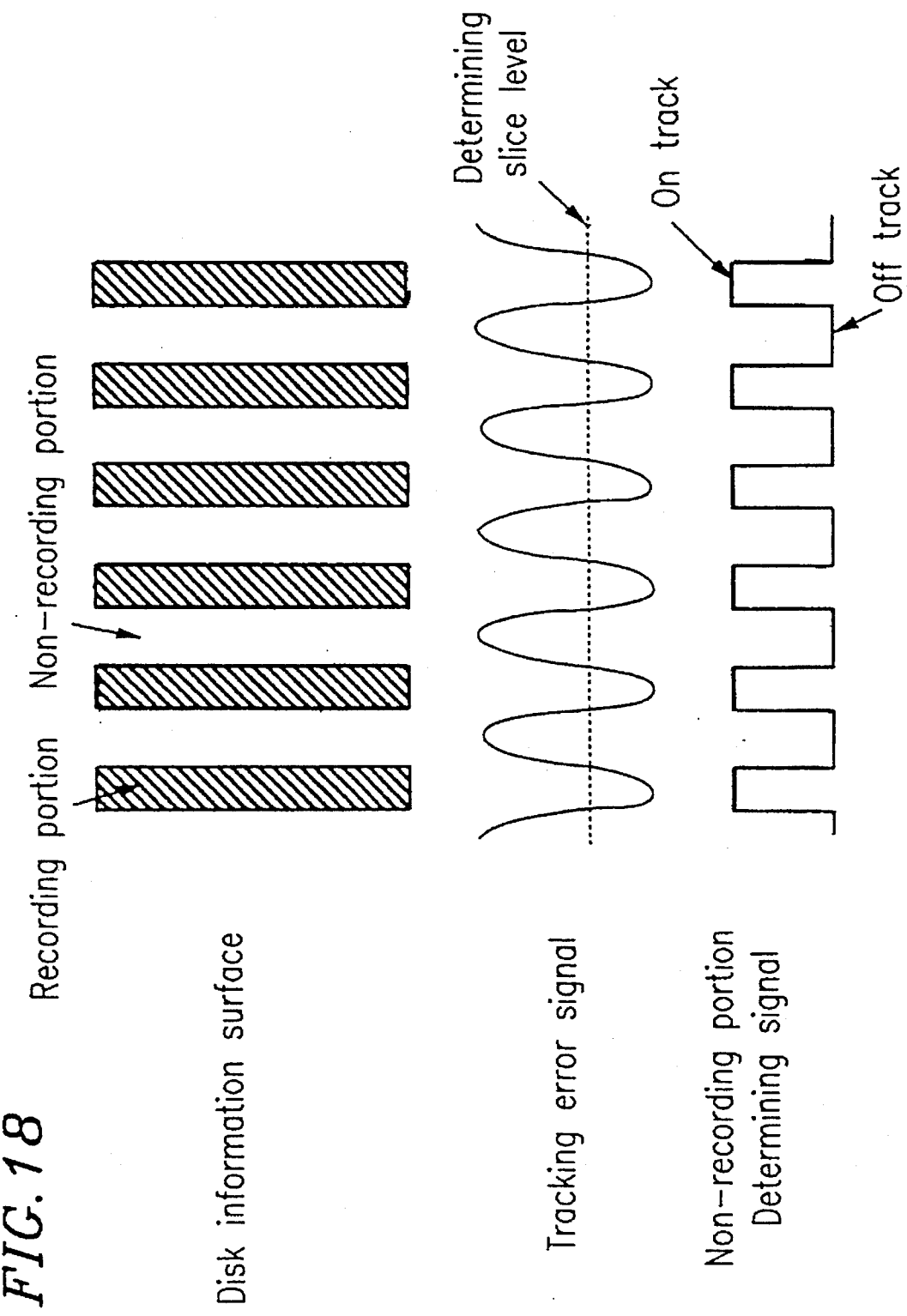
FIG. 18 schematically shows the relationship between the presence/absence of the recorded signal and a tracking error signal.

As shown in FIG. 18, the drop out detecting section 3 of the first and the second examples may generate a non-recording portion determining signal which indicates whether or not the reproducing section 29 traverses the portion where no signal is recorded, and uses the signal as a part of information specifying a lack of data in the reproduced signal. The non-recording portion determining signal is generated, for example, by detecting a tracking error signal which occurs in traversing a plurality of tracks of recording portions, and by digitizing the tracking error signal at a predetermined level so as to convert the tracking error signal into a digital signal.

In the foregoing examples, a case where a signal is reproduced at a constant linear velocity from the disk on which the signal has been recorded at a constant linear velocity has been described. However, according to the present invention, it is possible to adaptively vary the oscillation frequency of the phase lock loop section 5. Accordingly, the reproduction is not necessarily performed at a constant linear velocity.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk reproducing apparatus comprising;

a waveform equalizing means for emphasizing a predetermined range of frequency band of a reproduced signal;

a digitizing means for digitizing the reproduced signal which has been emphasized by the wave equalizing means at a predetermined level, so as to convert the emphasized reproduced signal into a digital signal;

a period detecting means for detecting and outputting a period of a predetermined pattern included in the digital signal;

a phase lock loop means having a free-run period, for controlling the free-run period based on the output of the period detecting means so that the free-run period becomes substantially equal to a period of a clock component of the digital signal, and for outputting a reproduced clock signal by reproducing the clock component of the digital signal; and a synchronizing means for synchronizing the digital signal with the reproduced clock signal so as to output a synchronized signal as reproduced data, wherein the period detecting means comprises:

a counting means for successively counting a pulse width or a pulse interval of the digital signal;

a maximum value memory means for holding a maximum value of all the counted values obtained by the counting means during a predetermined period, the maximum value being updated every time a new maximum value is detected;

an adding means for adding the maximum value held by the maximum value memory means and a subsequent counted value obtained by the counting means so as to obtain an added value in response to the update of the maximum value in the maximum value memory means; and a maximum value detecting means for outputting the added value as a period of the predetermined pattern every time the predetermined period has passed.

2. An optical disk reproducing apparatus according to claim 1, wherein the period detecting means counts a pulse width or a pulse interval of the predetermined pattern of the digital signal by the use of a clock and holds a counted value by stopping the clock in response to an external signal.

3. An optical disk reproducing apparatus according to claim 2, wherein the external signal is a signal for detecting a defect of a disk.

4. An optical disk reproducing apparatus according to claim 1, wherein the period detecting means counts a pulse width or a pulse interval of the predetermined pattern of the digital signal by the use of a clock and holds a counted value when the counted value falls into a predetermined range.

5. An optical disk reproducing apparatus according to claim 1, wherein the predetermined range of frequency band emphasized by the waveform equalizing means is varied inversely proportional to the output of the period detecting means.

6. An optical disk reproducing apparatus according to claim 1, wherein, in starting a reproducing operation, the predetermined range of frequency band emphasized by the waveform equalizing means is temporarily shifted to be higher than a frequency band emphasized by the waveform equalizing means during a steady reproducing operation.

7. An optical disk reproducing apparatus according to claim 1, wherein, in performing a seek operation from an inner periphery to an outer periphery, the predetermined range of frequency band emphasized by the waveform equalizing means is temporarily shifted to be higher than a frequency band emphasized by the waveform equalizing means during a steady reproducing operation.

8. An optical disk reproducing apparatus according to claim 1, wherein the period detecting means counts a period of the predetermined pattern of the digital signal by the use of a clock, and adds or subtracts an offset value smaller than a resolution of a counted result.

9. An optical disk reproducing apparatus according to claim 2, wherein a frequency of the clock is set so that a minimum resolution for setting a free-run frequency of the phase lock loop means is within a lock-in range of the phase lock loop means.

10. An optical disk reproducing apparatus comprising;

a waveform equalizing means for emphasizing a predetermined range of frequency band of a reproduced signal;

a digitizing means for digitizing the reproduced signal which has been emphasized by the wave equalizing means at a predetermined level, so as to convert the emphasized reproduced signal into a digital signal;

a period detecting means for detecting and outputting a period of a predetermined pattern included in the digital signal:

a phase lock loop means having a free-run period, for controlling the free-run period based on the output of the period detecting means so that the free-run period becomes substantially equal to a period of a clock component of the digital signal, and for outputting a reproduced clock signal by reproducing the clock component of the digital signal; and a synchronizing means for synchronizing the digital signal with the reproduced clock signal so as to output a synchronized signal as reproduced data, wherein the period detecting means comprises:

a first counting means for counting a first interval between rising edges of the reproduced signal;

a second counting means for counting a second interval between falling edges of the reproduced signal; and a determining means for calculating one of a minimum value and a maximum value of the sum of the first interval counted by the first counting means and the second interval counted by the second counting means every time a predetermined period has passed, as a period of the predetermined pattern.

11. An optical disk reproducing apparatus comprising:

a waveform equalizing means for emphasizing a predetermined range of frequency band of a reproduced signal;

a digitizing means for digitizing the reproduced signal which has been emphasized by the wave equalizing means at a predetermined level, so as to convert the emphasized reproduced signal into a digital signal;

a period detecting means for detecting and outputting a period of a predetermined pattern included in the digital signal;

a phase lock loop means having a free-run period, for controlling the free-run period based on the output of the period detecting means so that the free-run period becomes substantially equal to a period of a clock component of the digital signal, and for outputting a reproduced clock signal by reproducing the clock component of the digital signal; and a synchronizing means for synchronizing the digital signal with the reproduced clock signal so as to output a synchronized signal as reproduced data, wherein the period detecting means comprises:

a counting means for successively counting a pulse width or a pulse interval of the digital signal;

a holding means for holding a counted result obtained immediately before by the counting means;

an adding means for adding the output of the counting means and the output of the holding means so as to obtain the sum of two successive pulse widths or pulse intervals of the digital signal; and a determining means for calculating one of a minimum value and a maximum value of all the output of the adding means every time a predetermined period has passed, as a period of the predetermined pattern.

12. An optical disk reproducing apparatus comprising:

a waveform equalizing means for emphasizing a predetermined range of frequency band of a reproduced signal;

a digitizing means for digitizing the reproduced signal which has been emphasized by the wave equalizing means at a predetermined level, so as to convert the emphasized reproduced signal into a digital signal;

a period detecting means for detecting and outputting a period of a predetermined pattern included in the digital signal;

a phase lock loop means having a free-run period, for controlling the free-run period based on the output of the period detecting means so that the free-run period becomes substantially equal to a period of a clock component of the digital signal, and for outputting a reproduced clock signal by reproducing the clock component of the digital signal; and a synchronizing means for synchronizing the digital signal with the reproduced clock signal so as to output a synchronized signal as reproduced data, wherein the period detecting means comprises:

a counting means for successively counting a pulse width or a pulse interval of the digital signal;

a holding means for holding a counted result obtained immediately before by the counting means;

an adding means for adding the output of the counting means and the output of the holding means so as to obtain the sum of two successive pulse widths or pulse intervals of the digital signal;

a first determining means for calculating a minimum value of all the output of the adding means every time a predetermined period has passed;

a second determining means for calculating a maximum value of all the output of the counting means every time the predetermined period has passed;

an estimating means for estimating a range of the output of the second determining means based on the output of the first determining means; and a prohibiting means for outputting the output of the second determining means if the output of the second determining means is within the estimated range of the output of the second determining means, and for prohibiting the output of the second determining means and holding the value obtained immediately before if the output of the second determining means is out of the estimated range of the output of the second determining means.

* * * * *